United States Patent [19]

Cripe et al.

[11] Patent Number: 4,817,536
[45] Date of Patent: Apr. 4, 1989

[54] RAIL BOGIE FOR CONVERTIBLE RAIL-HIGHWAY VEHICLE

[76] Inventors: Christopher A. Cripe, 1903 Escourt Dr., Coatesville, Pa. 19320; Alan R. Cripe, 4511 Menokin Rd., Richmond, Va. 22335

[21] Appl. No.: 45,582

[22] Filed: May 4, 1987

[51] Int. Cl.$^4$ ............................................. B61F 5/10
[52] U.S. Cl. ............................. 105/182.1; 105/185; 105/198.1; 105/199.3
[58] Field of Search ............... 105/157.1, 158.1, 158.2, 105/159, 182.1, 198.1, 198.2, 199.1, 199.2, 199.3, 200, 201, 211, 212, 226, 185

[56] References Cited

U.S. PATENT DOCUMENTS

| | | | |
|---|---|---|---|
| 3,190,237 | 6/1965 | Hurtner | 105/182.1 |
| 3,212,460 | 10/1965 | Peras | 105/199.3 X |
| 3,290,056 | 12/1966 | Smith | 105/198.1 X |
| 3,990,372 | 11/1976 | Eggert et al. | 105/199.3 X |
| 4,237,791 | 12/1980 | Jackson et al. | 105/198.1 X |
| 4,538,524 | 9/1985 | Eggert, Jr. | 105/198.1 |
| 4,569,291 | 2/1986 | Grevisse | 105/198.1 X |
| 4,693,185 | 9/1987 | Easton et al. | 105/198.1 X |

*Primary Examiner*—Leonard E. Smith
*Attorney, Agent, or Firm*—Staas & Halsey

[57] ABSTRACT

A rail bogie for a convertible rail-highway vehicle system having an overall height of approximately thirty inches so that the bogie can fit under the rear of a semi-trailer body, all necessary braking equipment, except for air hose connections; a structure which maintains the axle alignment "square" at all times, includes air springs so as to improve ride quality and to enable the bogie height to be altered via pneumatic controls and takes downward loads outboard at the air spring locations rather than through the connection of the bogie to an associated vehicle; duplicate pneumatic controls and air hose connections on both sides of the vehicle so that the vehicle body can be coupled to the bogie from either direction; and can be lifted by an attachment device used to attach the bogie to an associated vehicle body.

25 Claims, 4 Drawing Sheets

RAIL BOGIE FOR CONVERTIBLE RAIL-HIGHWAY VEHICLE

BACKGROUND OF THE INVENTION

The present invention relates to rail bogies and, more particularly, to a separable rail bogie for use in conjunction with convertible rail-highway vehicle systems which employ separable rail bogies.

Convertible semi-trailer vehicles having over-the-road or highway running gear with rubber-tired wheels and a separable flanged-wheel rail bogie are known, generally. In these vehicles, the semi-trailer body is supported upon the highway running gear during over the road travel and is supported on a rail bogie during travel over railroad tracks. A retractable mounting is provided for the highway wheels so that they can be raised or lowered for selective use of the vehicle in the railway mode or highway mode of travel, respectively. Alternately, the highway running gear can be detachably mounted so that it may be removed in its entirety from the semi-trailer body when attachment to a rail bogie for railway travel is desired. The highway running gear can be of the single-axle or the tandem-axle type. In each case, each axle carries sets of tires of conventional size which allow maximum loads to be carried as legally permissible. The rail bogie is detached from the semi-trailer body for operation of the vehicle in the over-the-road or highway mode of travel.

Rail bogies are known, generally, as are separable rail bogies for convertible rail-highway vehicles and are shown for example in U.S. Pat. Nos.: 4,538,524, 4,332,201, 3,712,245, 3,358,615, 2,758,549, 2,036,535, 2,963,986, 4,276,968, 4,316,640, 4,387,933, 4,448,132, and 4,574,707. Heretofore, however, separable rail bogies provided for convertible rail-highway vehicles were generally based upon conventional railroad bogies as used on railway cars with a few added features so that such a rail bogie can be releasably attached to a semi-trailer vehicle. In other words, the basic idea of convertible rail-highway vehicles with separable rail bogies was to take a conventional rail bogie or truck and add a special attachment structured to enable attachment to a trailer.

One problem with so modifying a conventional railroad bogie is that standard railway bogies have steel-spring suspensions. Thus, as load changes are encountered in the semi-trailer body, the rail bogie springs will simply compress more in response to the added load. This changes the ride height of the semi-trailer vehicle, making the same closer to the railway tracks as the load in the vehicle increases. This change in ride height can be as much as three inches, which renders the clearance between the rails and the highway wheels which have been retracted for railway travel insufficient.

Another problem with the variance in ride height is when one semi-trailer vehicle in the rail mode is to be coupled to an adjacent vehicle. If the two vehicles are carrying loads of different weights, the ride height of each vehicle will be different and the coupling of the two vehicles will be difficult. The above-mentioned problems associated with steel-spring rail bogie suspensions may be minimized by providing stiffer springs so that ride height variances are minimized. However, providing stiffer springs deteriorates the quality of ride.

Another problem associated with the provision of conventional rail bogie steel-spring suspension is encountered when a semi-trailer body is to be detached from the rail bogie for operation in the highway mode. When a large load is carried in the semi-trailer body, the resulting reduced ride height in the rail mode means that the highway wheels, once lowered to their ground-engaging position, must then provide the energy to lift the vehicle body sufficiently so as to enable its disengagement from the rail bogie. Indeed, even if the semi-trailer body is empty, its own dead weight will compress the springs of a conventional rail bogie from their unloaded state, requiring the vehicle's highway wheels to raise the vehicle body for disengagement from the rail bogie. The lower the ride height of the vehicle when in the rail mode, the more work must be done by the highway wheels, which slows the process of changing from the rail mode to the highway mode of operation.

Another difficulty encountered with the railway bogies heretofore provided is that the side-frames of the rail bogie may move longitudinally relative to one another into a "parallelogram" mode. Parallelogramming is a very undesirable misalignment of the axles which may result in premature wheel wear or bogie instability. For proper operation, the bogie axles should remain perpendicular to the sideframes at all times.

Yet another difficulty encountered with the provision of conventional rail bogies is that conventional railway cars are designed so that all of their weight is carried by the center of the cross-structure or bolster of the associated rail bogie. Because of this practice, the cross-structure or bolster of conventional bogies is a massive, strong, and heavy structure, as it must at times support a load on the order of fifty tons. Because the bolster is so massive, conventional rail bogies are very heavy, making transport and repeated coupling operations in conjunction with convertible rail-highway vehicles time consuming and difficult.

Even further, because the conventional bolster structure is so large and heavy, there is very little space available on a conventional rail bogie for the installation of brake equipment. The brake equipment necessary for operation in the rail mode is typically very expensive and relatively bulky. Ideally, the brake equipment should be provided on the rail bogies rather than on the highway semi-trailer bodies of convertible rail-highway vehicles so that the equipment will not be damaged during operation over highways. Further, providing the brake equipment on an associated rail bogie enables repair of the equipment without withdrawing the entire semi-trailer body from the transport system.

In view of the foregoing, it would be desirable to provide a rail bogie for convertible rail-highway vehicle systems employing separable rail bogies that addresses the disadvantages of conventional rail bogies and which can be effectively used under actual operating conditions.

SUMMARY OF THE INVENTION

It is an object of the present invention to overcome the disadvantages of providing a conventional railroad bogie for convertible rail-highway vehicles, set forth above. More particularly, the present invention provides a rail bogie which has an overall height of approximately thirty inches so that the bogie can fit under the rear of a semi-trailer body, all necessary braking equipment mounted thereon except air hose connections, a structure which maintains axle alignment at all times, air springs so as to improve ride quality and to enable the bogie height to be altered via pneumatic controls, and a structure or frame that takes downward loads outboard at the air spring locations rather than through the connection of the bogie to an associated vehicle so that the bolster size can be minimized and so that the above-mentioned braking equipment can be mounted on the rail bogie. A device such as a king pin is provided on the rail bogie bolster for attaching the bogie to an associated vehicle body. This attachment device can also be used as a means to lift the rail bogie for transport about a railway yard. Thus, a rail bogie formed in accordance with the present invention, once separated from an associated semi-trailer body, includes all braking equipment and other equipment necessary for it to stand alone as a complete "mini-railcar" with the exception of air hose connections between bogies, which are a part of the semi-trailer bodies themselves.

In a system of operations utilizing rail bogies formed in accordance with the present invention, not as many rail bogies as semi-trailer bodies are needed. Therefore, one can provide a single bogie for every three or four trailers in a fleet. Because most of the expensive equipment associated with railway travel is provided on the rail bogie, in accordance with present invention, a substantial amount of capital outlay can be saved.

In addition, by providing air springs on the rail bogie, a constant ride height for the associated semi-trailer vehicles can be provided regardless of the load carried by any trailer. More particularly, when air springs are used, a constant ride height can be easily maintained by the use of automatic levelling valves which admit compressed air into air springs so as to provide the proper air spring pressure to offset the load. By providing other pneumatic controls, compressed air can also be admitted to or exhausted from the air springs independently of the action of the levelling valves, thus enabling an operator to intentionally raise or lower the vehicle ride height under special circumstances. Thus, a vehicle can be easily removed from an associated rail bogie, and coupling adjacent vehicles together can be accomplished quickly and easily under adverse operating conditions. Thus, a vehicle can be easily removed from an associated rail bogie, and the coupling of adjacent vehicles can be accomplished quickly and easily under even adverse operating conditions.

Further, with the rail bogie formed in accordance with the present invention, vertical loads are not taken through the center of the bolster of the rail bogie where the bogie is attached to an associated semi-trailer vehicle, but, rather, the vehicle vertical load is taken through the side frames in that the associated semi-trailer body sits on a pair of side bearings provided atop the air spring locations of the rail bogie. Since vertical loads are not taken through the bolster assembly, the bolster can be formed much lighter and with less bulk. Thus, there is room on the rail bogie for the inclusion of all the associated braking equipment and air hose connections need only be provided for coupling to the associated semi-trailer vehicle to provide continuity of braking control between vehicles.

Even further, in the rail bogie formed in accordance with the present invention, a structure is provided which maintains the rail bogie "square" at all times to minimize wear of the railway wheels and to maintain the wheel axles perpendicular to the bogie sideframes during railroad operation. More particularly, the structure which maintains the rail bogie square includes a pair of tubes that run transversely across the rail bogie, each tube being integral with a respective bogie sideframe, one of the tubes being relatively long and one of the tubes being relatively short. The longer tube is disposed within the shorter tube and a bearing is provided between the two tubes so that the tubes are free to rotate relative to one another, thus allowing the bogie sideframes to articulate relative to one another. This allows the rail wheels to accurately accommodate track irregularities, while at the same time articulated tube structure prevents one side frame from moving forwardly relative to the other side frame.

BRIEF DESCRIPTION OF THE DRAWINGS

Other objects, features, and characteristics of the present invention, as well as the methods of operation and functions of the related elements of the structure, and the combination of parts and economies of manufacture, will become more apparent upon consideration of the following description and the appended claims with reference to the accompanying drawings, all of which form a part of this specification, wherein like reference numerals designate corresponding parts in the various figures and wherein:

DETAILED DESCRIPTION OF THE PRESENTLY PREFERRED EXEMPLARY EMBODIMENT

Figure 1:
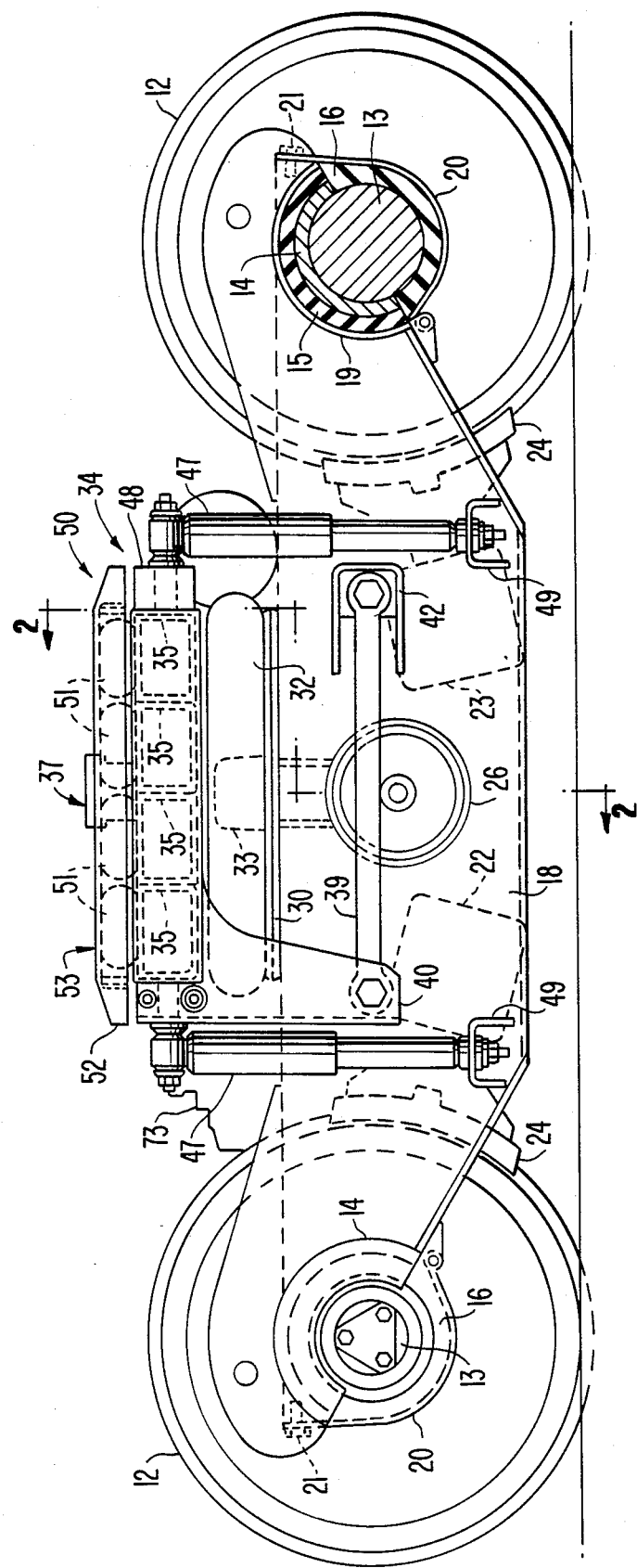
FIG. 1 is an elevational view, partly broken away for clarity, of a rail bogie formed in accordance with the present invention.
Figure 2:
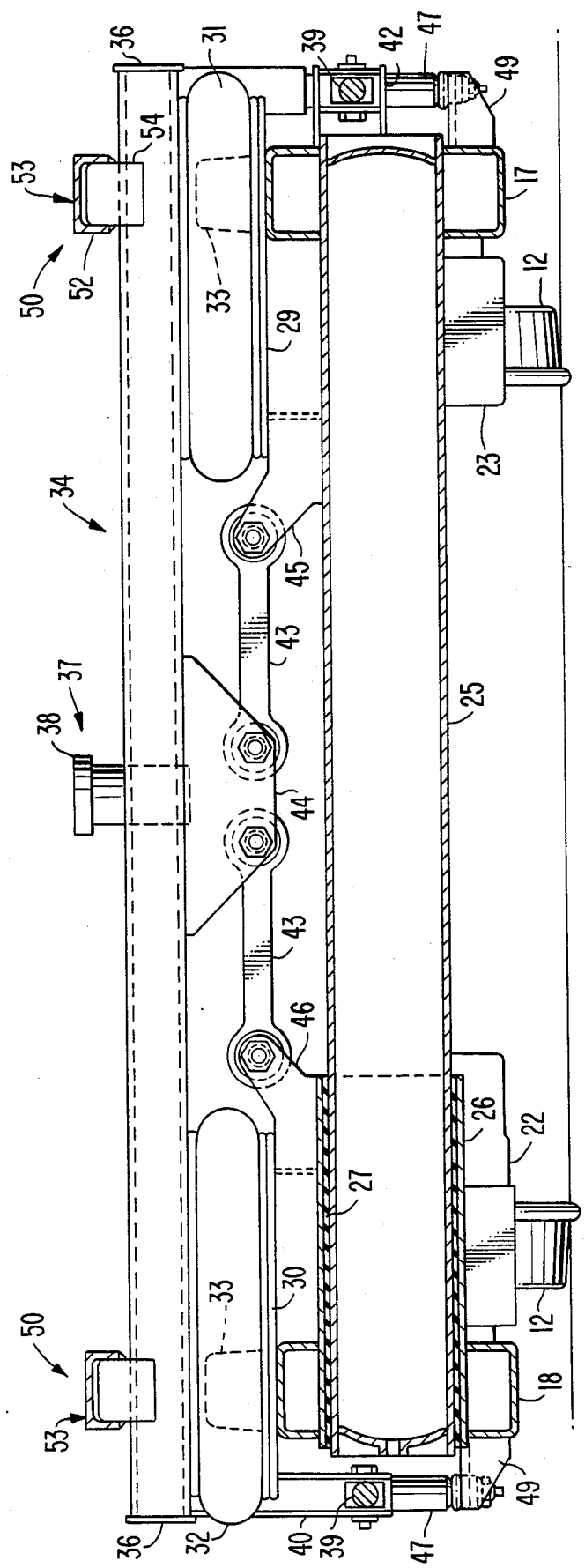
FIG. 2 is a partial sectional view taken along line 2—2 of FIG. 1.
Figure 3:
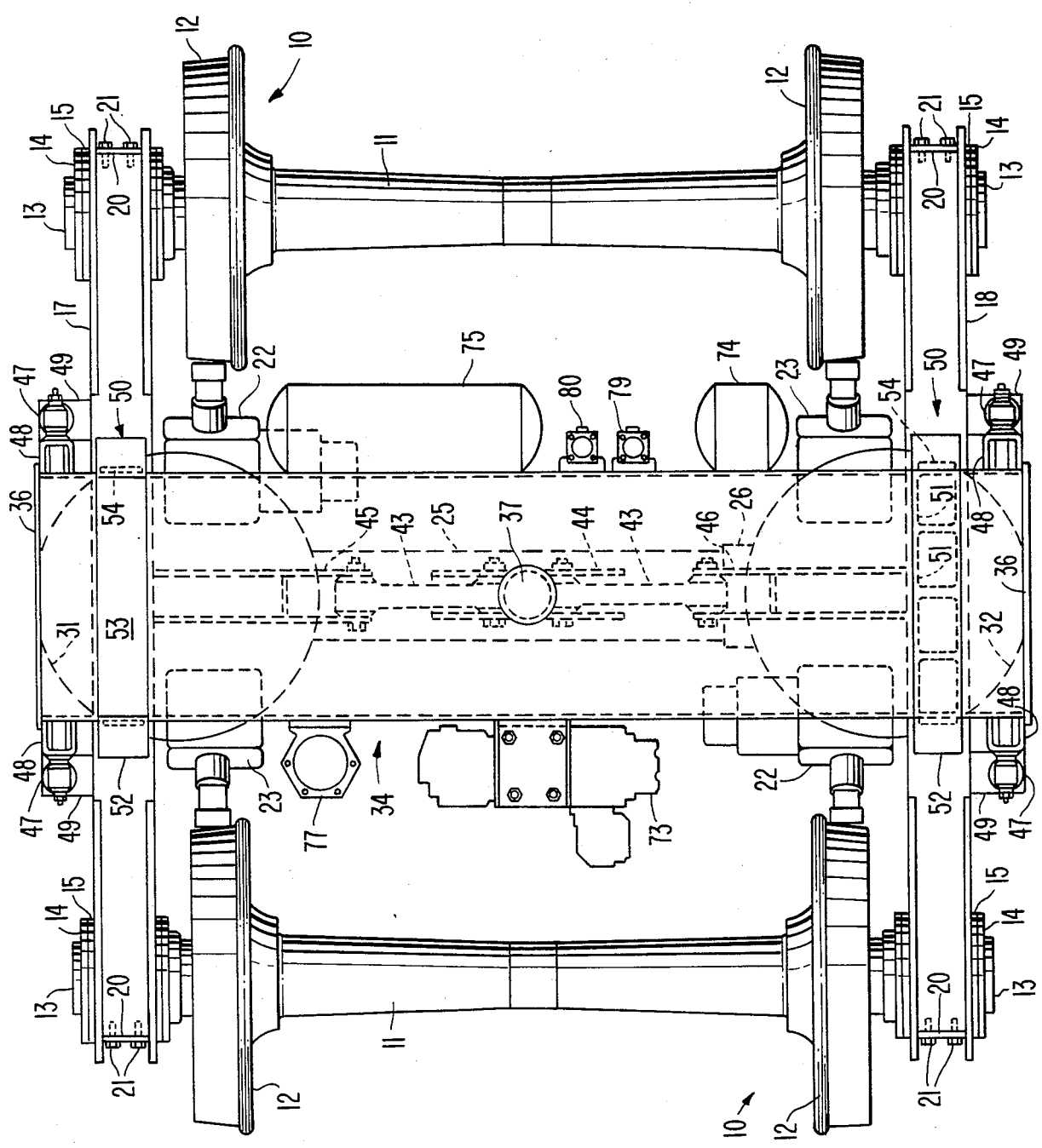
FIG. 3 is a top plan view of a rail bogie formed in accordance with the present invention.

Referring to FIGS. 1–3, a rail bogie formed in accordance with the present invention includes two wheel set assemblies 10 each composed of an axle 11, two rail wheels 12 and roller bearings 13 on each end of each axle. The rail wheels 12 are about twenty-eight inches in diameter which enables the overall height of the bogie to be kept at a minimum so that the bogie can fit under the rear of a semi-trailer body. In this manner, the underride protective device normally required on the rear of a semi-trailer need not be removed prior to coupling the trailer to a separable rail bogie formed in accordance with the present invention.

Atop each roller bearing 13 is a semicircular bearing adapter 14 which serves as the interface between each bearing and its associated resilient mounting bushings or shock pads. Upper shock pads 15 and lower shock pads 16, typically made of rubber or other resilient material, serve to provide a resilient mounting for each roller bearing, thus allowing each wheelset 10 to follow track irregularities without imparting excessive twisting forces into the bogie structure.

Connecting the wheelset assemblies on each side of the bogie are sideframe assemblies 17 and 18. The sideframes feature semicircular reliefs 19 at each end thereof to accept an upper shock pad 15 for mounting each wheelset. The wheelsets are retained to the sideframes with straps 20 beneath each lower shock pad 16. Straps 20 may be removed for maintenance purposes by removing retaining bolts 21, thus allowing removal of the wheelsets. Each sideframe assembly (17,18) is equipped with mountings for brake actuators 22,23. The brake actuators are modular units containing pneumatic brake cylinders as well as the necessary linkages and slack-adjusting means to force the brake shoes 24 against the wheel treads during braking, as will be more fully described below with reference to FIG. 4.

Centrally located on each sideframe assembly and integral therewith is a transverse tubular member. Sideframe assembly 17 includes a main gimbal tube 25 which extends all the way across the bogie and through the opposite sideframe assembly 18. Sideframe assembly 18 includes a shorter tube 26 of slightly larger diameter than main gimbal tube 25.

Main gimbal tube 25 is sealed at each end with suitable closure plate and also serves as a pressure vessel for the air brake system of the bogie, as will be described more fully below. A suitable wear-resistant bearing sleeve 27 is interposed between tubes 25 and 26, allowing the tubes to rotate relative to one another. This structure allows each side frame 17,18 to articulate relative to the other so that wheels sets 10 may follow track irregularities. At the same time, the axle alignment is maintained "square" at all times and thereby "parallelogramming" of axles 11 and side frames 17,18 which can occur with standard railroad bogies, is prevented.

Each side frame assembly 17,18 further includes a substantially circular plate 29,30 atop its center region upon which an air spring assembly 31,32 is mounted, respectively. Airspring assemblies 31,32 include internal bumpers 33 as may be seen in FIGS. 1 and 2. The bumpers are made of synthetic resilient materials and are about one inch shorter than the normal operating height of the airspring. Should a failure occur causing deflation of the airspring, the bumper 33 provides temporary springing for the bogie. Under normal operating conditions, the airsprings provide the suspension springing means for the bogie.

Further, attached to the upper end of each air spring assembly 31,32 and running transversely across the bogie is a bolster assembly, shown generally as 34. Bolster assembly 34 serves as the member to which an associated vehicle body is attached for operation in the rail mode. Bolster 34 of the present invention also provides mounting points for the airbrake valves and reservoirs, other required pneumatic controls, and, advantageously, the bolster provides an auxiliary air reservoir for each airspring. More particularly, bolster assembly 34 is formed from rectangular tubular members 35 welded together side by side, as can best be seen in FIGS. 1 and 2. The ends of these "cells" 35 are closed off with suitable plates 36 so as to create a group of airtight cells, half of which are connected to one air spring 31 and half connected to the other air spring 32. As such, cells 35 provide auxiliary air reservoirs for the air springs.

An upwardly projecting pin 37 is disposed in the center of bolster assembly 34 with an enlarged top portion 38. Pin 37 mates with a locking device disposed on the lower surface of an associated semi-trailer vehicle body (not shown) so that the bogie can be quickly and easily attached thereto. Pin 37 so mounted provides a center of rotation for the bogie relative to the vehicle for curve negotiation, and also enables the transfer of lateral and longitudinal forces between the bogie and the vehicle body. However, downward loading on the bogie due to the vehicle dead weight and load is not taken through pin 37. Rather, these loads are taken outboard at the air spring locations so as to provide a direct force transmission path onto sideframe assemblies 17,18 and from there to wheelsets 10.

Lateral and longitudinal forces are transmitted between bolster assembly 34 and side-frame assemblies 17,18 by pivoted links. Longitudinal forces are transmitted by longitudinal links 39, one such link being pivotally mounted to a downwardly-projecting bracket 40 at each end of bolster assembly 34. The opposite end of each longitudinal link 39 is pivotally connected to an outwardly-projecting bracket 42 affixed to each sideframe assembly. Longitudinal links 39 are equipped with resilient bushings at their pivotal mountings so as to provide for lateral movement as well as vertical movement of bolster assembly 34 relative to sideframe assemblies 17, 18.

Lateral forces are transmitted between the bolster assembly 34 and the sideframe assemblies 17,18 by lateral links 43. Lateral links 43 are pivotally connected to the bolster assembly 34 at a downwardly-projecting bracket 44 beneath pin 37. The opposite ends of the lateral links 43 are pivotally connected to each sideframe assembly 17,18 at brackets 45 and 46 respectively. The lateral links 43 are each provided with large resilient bushings at both ends so as to provide a limited amount of lateral freedom for bolster assembly 34 relative to the sideframe assemblies 17,18, thus improving ride quality. Lateral links 43 are pivotally mounted at both ends to allow free vertical motion of bolster assembly 34 relative to sideframe assemblies 17,18.

Vertical motions of bolster assembly 34 relative to sideframe assemblies 17,18 are damped by the use of shock absorbers 47 interposed between them on each side of the bogie. The upper end of each shock absorber 47 is pivotally connected to a bracket 48 at each end of the bolster assembly 34. The lower end of each shock absorber 47 is connected to a bracket 49 projecting from each sideframe assembly 17,18. The shock absorbers 47 provide viscous damping for the airsprings and also serve as stops to limit the vertical motion of the bolster, when fully extended.

Located on the upper surface of bolster assembly 34 adjacent each end are side bearing assemblies, shown generally as 50. Side bearings 50 engage the vehicle body during operation in the rail mode to serve as the principal vertical load bearing members of the bogie. An associated vehicle body (not shown) is provided with longitudinal structural members located at appropriate transverse spacing to engage the side bearing assemblies 50 of the rail bogie of the present invention. Vertical loading on the bogie due to the vehicle weight is transmitted through the side bearings 50, directly downward through the bolster assembly 34, through the airsprings 31,32 into the sideframes 17,18, and then fore and aft to the wheelsets 10. Because vertical loads on the bogie are carried outboard at the side bearing locations, bolster assembly 34 is substantially light and compact as compared to conventional rail bogies. The side bearing assemblies 50 are composed of stiff elastomeric blocks 51 which sit atop bolster assembly 34. A metal shoe 52 with a low-friction plastic facing 53 on its upper surface sits atop the elastomeric blocks 51. Each shoe 52 is keyed to the bolster assembly 34 by lugs 54 so as to prevent lateral or longitudinal movement of the shoe relative to the bolster. The resilience of the elastomeric blocks 51 allows the metal shoe 52 of each side bearing to fully engage the structural member provided on the vehicle body (not shown) and provides compensation for manufacturing misalignments of those members.

As is apparent from the foregoing, a rail bogie formed in accordance with the present invention is fully bi-directional in that all pneumatic controls and air hose connections to the vehicle body are duplicated on both sides of the bogie. Thus, an associated vehicle body can be coupled to the rail bogie from either direction and the bogie controls can be operated from either side of the rail bogie. Furthermore, by means of center pin 37, the bogie can be readily lifted off the rails or placed onto the rails by a suitable bogie handling vehicle such as that described in my copending application Ser. No. 07/016,205, filed Feb. 18, 1987, the disclosure of which is incorporated herein by reference. Further, because bolster assembly 34 is substantially light in weight as compared to conventional rail bogies, the transport and handling of the bogie is greatly facilitated in accordance with the present invention.

The rail bogie pneumatic system will now be described in greater detail. The pneumatic system, hereafter referred to as the air system of the rail bogie, includes all the necessary braking and auxiliary components necessary for the railroad operation of convertible rail-highway vehicles with the exception of the two main air hoses (not shown) which connect the rail bogie to its associated semi-trailer body when the vehicles are in their train configuration. These two main air hoses and the related fittings are provided on the semi-trailer body and, as such, are not part of the rail bogie air system. As is apparent, providing substantially the entire air system necessary for the rail mode operation of convertible rail-highway semi-trailers on the rail bogie itself allows the associated vehicle bodies to be simpler and less expensive. Further, incorporation of the air system allows the air system and the bogie to be examined and fully tested as a unit and protects the air system from damage while the semi-trailer vehicle body is utilized in the highway mode.

Figure 4:
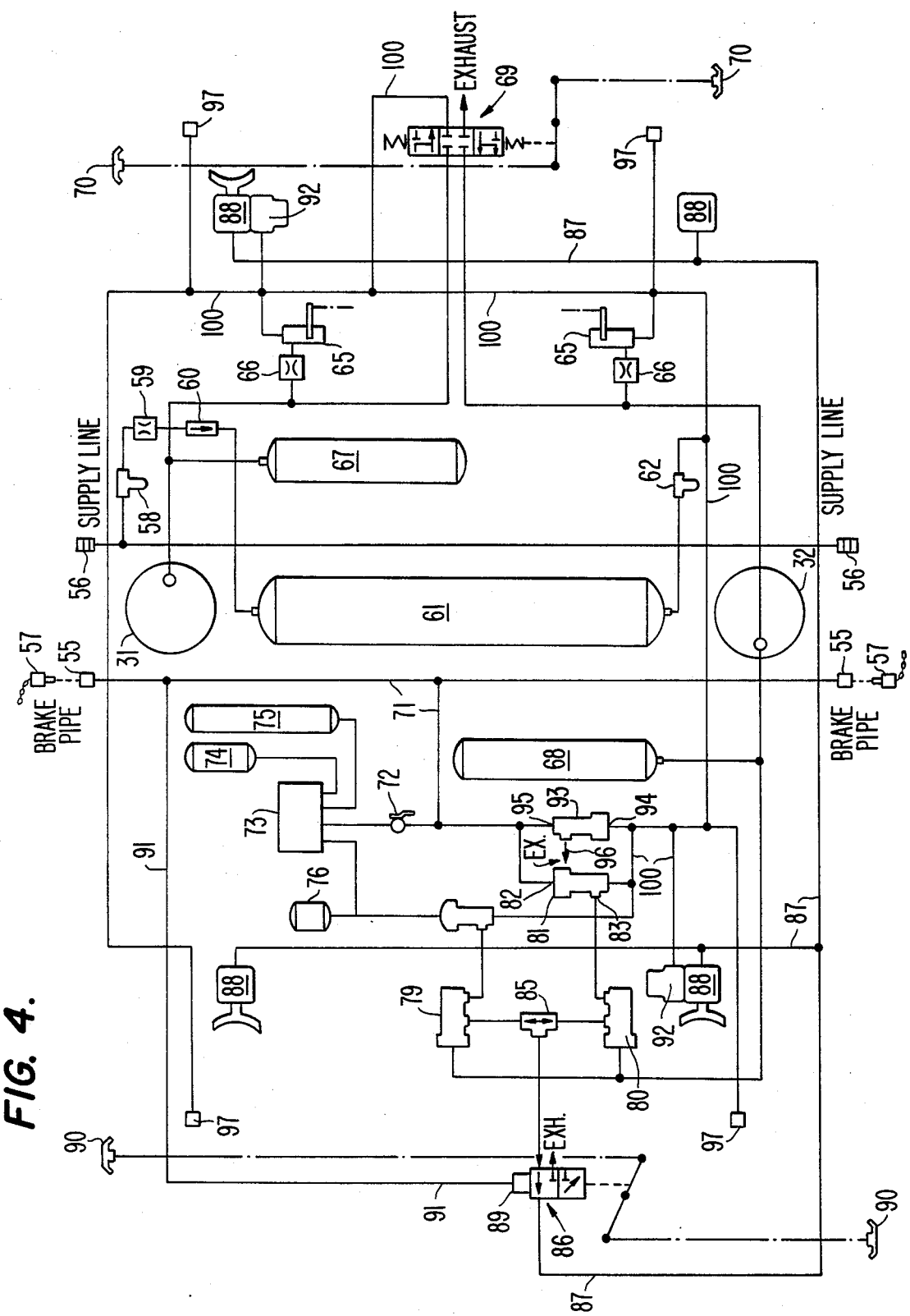
FIG. 4 is a schematic plan view of the rail bogie pneumatic system of the present invention.

Referring to FIG. 4, the air system of the present invention is shown schematically for clarity. The illustrated air system is substantially a plan view of the disposition of the air system components in an actual rail bogie with a main reservoir 61 of the system corresponding to the central transverse gimbal tube 25 of the bogie and flanked by the left and right air springs 31,32. Further, for clarity, the illustrations show the brake system components primarily on the left side of FIG. 4 and the air spring control components primarily on the right side of FIG. 4. In actual hardware form, however, the components are less segregated than shown in the drawing and are located in accordance with available space on the rail bogie.

The air system provided in accordance with the present invention utilize a "two-pipe" system. Conventional freight rail cars, on the other hand, employ a standard "single-pipe" system, with a single brake pipe running the length of the train. However, because the air system of the present invention is utilized on a rail bogie which employs airsprings and other components requiring a constant air supply, a second pipe running the length of the train is employed, referred to herein as the supply line. This line is connected to the locomotive main reservoir at the front of the train through suitable pressure-reducing valves and is closed off at the rear of the last car. Typically, the supply line formed in accordance with the present invention operates at a constant 120 psi. Thus, this system utilizes a conventional brake pipe for application and release of the brakes and a additional supply line to provide a constant air supply for other components of the bogie air system.

Referring to FIG. 4, the rail bogie air system may be connected to its respective vehicle body at fittings 55 for the brake pipe and 56 for the supply line. The vehicle body carries the actual lengthwise brake pipe and supply line, along with the necessary provisions for the connection of these lines between vehicle bodies when in train formation. A flexible hose (not shown) extending from the vehicle body (not shown) and connected into the vehicle's brake pipe can be connected to the rail bogie at fittings 55, one such fitting being provided on each side of the rail bogie. Fittings 55 are preferably quick-disconnect devices of the "straight-through" variety in that no automatic shutoff devices are built into the fittings. Dummy plugs 57 are provided on the bogie to seal off fittings 55 not connected to the vehicle at any given time.

Similarly, a flexible hose (not shown) extending from the vehicle body (not shown) and connected to the vehicle's supply line can be connected to the rail bogie at fittings 56, one such fitting being provided on each side of the rail bogie. Fittings 56 are preferably quick-disconnect devices with automatic shutoff devices built in. This feature seals off each fitting in the absence of a mating fitting, preventing leakage. Further, the supply line fittings 56 and brake pipe fittings 55 are provided in different sizes so as to prevent accidental cross-connection.

Supply line air entering the system at either fitting 56 as directed through a filter/water separator 58 to remove contaminants which may be present. From filter 58, the air is directed through a restrictor choke 59 and then through a check valve 60 and into the bogie main reservoir 61, i.e. the main gimbal tube. Restrictor choke 59 serves to limit the amount of air that can be lost from the supply line should a failure occur on the bogie. Supply air in main reservoir 61 is directed through a second filter/water separator 62 and into line 100 as shown. Line 100 constitutes the air supply for all the remaining components on the bogie which require a constant air source. Line 100, being connected to main reservoir 61, normally remains pressurized at all times even when the bogie is not connected to its respective vehicle or other air supply source.

The air spring control portion of the vehicle is primarily shown on the right side of FIG. 4. Supply air from line 100 is connected to the inlet or supply ports of leveling valves 65, there being one leveling valve on each side of the bogie. Leveling valve 65 are 3-way mechanically-operated valves normally featuring an operating arm as a means of control. Leveling valves 65 are physically mounted on the bolster 34 of the bogie and a mechanical linkage is connected from each operating arm to the respective sideframe 17,18 of the bogie. Leveling valves 65 act to admit air to their respective air springs when the bogie bolster is "low" with respect to side frames 17,18 or to exhaust air from their respective air springs when the bolster is "high" with respect to side frames 17,18. Between these positions, a central position of the leveling valve operating arm closes all ports, providing a neutral position. Accordingly, the leveling valve linkages are adjusted to put the valves in their neutral positions at normal bolster operating height.

In addition, valves 65 are connected to their respective airsprings 31,32 through restrictor chokes 66. Restrictor chokes 66 are included so as to restrict air loss should an air spring fail and to "slow down" the action of the leveling valves to minimize constant filling and exhausting of the air springs under certain rough track conditions. Air springs 31,32 are each connected to an auxiliary reservoir 67,68, respectively, which serves to increase the internal volume of each air spring in order to lower its natural frequency and to improve ride quality. The auxilary reservoirs 67,68 are actually part of the bogie bolster assembly 34, as was described above.

As can be further seen in FIG. 4, the airsprings 31,32 are also connected directly to an air spring control valve 69. Air spring control valve 69 is a three-position, spring-centered, manually operated multiport valve. This valve is spring-centered into its "normal" position wherein all ports of the valve are closed and therefore the airsprings 31,32 remain under the control of their levelling valves as described above.

As shown in phantom in FIG. 4, valve 69 is mechanically coupled to an operating handle 70 on each side of the bogie. This valve may be activated by an operator when it is desired to intentionally alter the bogie bolster height, as when coupling a vehicle body to the rail bogie or when coupling or uncoupling vehicles into or out of train formation. Should the need arise to lower the bogie bolster height, an operator can push on either air spring control handle 70. This in turn will shift air spring control valve 69 downward from its neutral position (as is shown) into its "exhaust" position. This opens both air springs to atmosphere. As airspring pressure escapes, the bolster of the bogie will settle to a lower height, depending upon how long the operator holds his command. During this process, levelling valves 65 will "sense" the low bolster height and attempt to supply air to the air springs to compensate. However, the presence of restrictor chokes 66 restricts this flow sufficiently to allow the bolster to remain in its lower position long enough for the bogie to be coupled to the vehicle body. The operator can cyclically operate the air spring control valve 69 to maintain a lower bolster height for longer periods if required. Once released, valve 69 will automatically return to its normal position because it is a spring centered valve. Thus, no special operator attention is required to return the rail bogie to its normal operating condition.

Should the need arise to raise the bogie bolster height, an operator can pull on either air spring control handle 70 to move valve 69 from its normal position into a "fill" position. This connects the bogie air supply from line 100 to airsprings 31,32. As the air pressure of the air springs increases, the air springs extend and raise the bogie bolster height. During this process, levelling valves 65 will "sense" the change in bolster height and attempt to exhaust the air springs to compensate. However, the presence of restrictor chokes 66 again restricts this corrective flow to "slow" the compensation sufficiently for the particular coupling or uncoupling operation to be successfully completed. Again, the operator can "cycle" the air spring control valve to maintain a raised bolster height for a longer period, if required. Once released, the air spring control valve 69 will return to its "normal" or centered position, returning control of the air springs to the levelling valves 65 exclusively.

The braking portion of the air system is shown primarily on the left side of FIG. 4. The brake pipe from the vehicle body can be connected to the bogie at either fitting 55 and a dummy plug 57 is provided to plug the opposite side fitting 55, as was discussed above. The brake pipe is connected to brake control valve 73 via line 71 and a cutout cock 72. Cutout cock 72 is normally open, but can be manually closed to isolate the control valve 73 from the brake pipe in case of any malfunction. Brake control valve 73 is of the standard "ABDW" type within auxiliary reservoir 74 and an emergency reservoir 75 connected to it as in standard practice. The operation of the brake control valve 73 follows standard practice as is known in the art. The "brake cylinder" port of brake control valve 73 is connected to a dummy brake cylinder reservoir 76 and to the control port of a relay valve 77. Dummy brake cylinder reservoir 76 is used to provide the proper volume for brake control valve 73 to "see" in lieu of a direct connection to a brake cylinder as in a standard rail car. When a brake application is called for, brake control valve 73 will produce the requisite pressure in dummy brake cylinder reservoir 76. This pressure is used to control relay valve 77 which will duplicate this pressure at its delivery port 78. Relay valve 77, delivers this pressure from supply air via line 100.

Relay valve 77 itself is a graduating valve and will increase its delivery pressure as its control pressure rises or will exhaust its delivery pressure as its control pressure decreases. By using a relay valve to deliver supply air ultimately to the brake cylinder, instead of a direct connection to the brake control valve, provides two advantages. First, auxiliary reservoir 74 and emergency reservoir 75 can be made much smaller than on conventional rail cars which saves space and weight. Secondly, relay valve 77 will compensate for leakage in the brake cylinders to maintain the proper pressure. This lowers the possibility of the brakes "leaking off" as can occur in standard rail cars.

The delivery port 78 of relay valve 77 is further connected to the inlet of service variable-load valve 79. Variable-load valves serve to limit the pressure at their delivery port according to another pressure at their control port, which in accordance with the present invention is coupled to one of the air springs 32, as can be see in FIG. 4. This arrangement serves to limit brake cylinder pressure according to air spring pressure which is directly related to the weight carried by the bogie. Indeed, conventional rail cars are seriously underbraked where large loads are carried resulting in excessive stopping distances. Further, conventional rail cars are seriously overbraked when empty resulting in wheel lockup and "slid flats". Variable-load valves provided on the rail bogie, in accordance with the present invention, maintain a virtually constant braking ratio regardless of the weight borne by the rail bogie. There are two variable-load valves in the system of the present invention, one for normal service braking (79) and one for emergency braking (80). Emergency variable-load valve 80 provides a higher output pressure than the service variable-load valve 79 for the same control (air spring) pressure. This provides shorter stopping distances in the case of an emergency.

Emergency braking is controlled by an emergency application valve 81 which is a pilot-operated 3-way inversion valve. When exposed to brake pipe pressure at its control port 82, via line 71, valve 81 acts to exhaust its delivery port 83 which in turn is connected to the inlet of the emergency variable-load valve 80. Therefore, under normal conditions emergency variable-load valve 80 is inactive. When brake pipe pressure drops to nearly atmospheric, as is the case during an emergency brake application, emergency application valve 81 loses its control pressure. It then acts to connect supply air from line 100 to delivery port 83 and hence to the inlet of the emergency variable-load valve 80. The emergency variable-load valve modulates this pressure according to air spring pressure at its control port.

The delivery port of the service variable-load valve 79 and the delivery port of the emergency variable-load valve 80 are connected to opposite inlet ports at shuttle valve 85. Shuttle valve 85 will pass the higher pressure at its inlet ports. Depending upon whether service braking or emergency braking is occurring, the shuttle valve 85 will assume a position allowing the higher application pressure to pass to the brake release valve 86.

Brake release valve 86 is a manually-operated three way valve with an auxiliary air pilot feature. A manual linkage (shown in phantom) allows an operator to operate a valve from either side of the rail bogie. The valve 86 is illustrated in its normal operating position where it allows brake cylinder pressure, either service or emergency, to flow freely from the delivery port of the shuttle valve 85 into bogie brake cylinders 88 via line 87. More particularly, because it can become necessary during certain operating conditions to move the bogie in the absence of brake pipe pressurization, i.e., when the bogie is separated from its respected vehicle body, the brake release valve 86 is provided. An operator may pull on either operating handle 90 provided on the bogie thereby shifting the brake valve 86 upward from its normal position. As can be further seen in the drawings, this position of the brake release valve closes off the delivery port of the shuttle valve 85, thereby shutting off brake cylinder pressure and simultaneously opens line 87 to exhaust. This vents any pressure present in the braking cylinders 88. Accordingly, the brakes are released and the bogie can be rolled to another location without the need to pressurize the brake pipe.

Because the brake release valve 86 can be used to defeat the brakes on the bogie, there is a danger that an operator can forget to reactivate the brakes at a later time. To eliminate this possibility, the brake release valve 86 is provided with an auxiliary air pilot control 89 which is connected to the brake pipe by line 91. This is simply a small air cylinder built into the valve, which, when pressurized, serves to urge the valve into its former operating position, as shown in FIG. 4. Thus, even if an operator should forget to return the brake release valve 86 to its normal position to make the brakes active, the air pilot device 89 will do so automatically the next time the bogie is connected to its vehicle and the brake pipe is pressurized prior to train departure.

The rail bogie of the present invention is not equipped normal "hand brakes" as are conventional rail cars. Manually operated hand brakes are far too time consuming to be practical in the type of service envisioned for rail bogies of the type described herein. As can be seen from the description above, any time the brake pipe is unpressurized, the emergency application valve 81 acts to direct air from the main reservoir 61 to the brake cylinders 88 via the emergency variable-load valve 80, shuttle valve 85, and brake release valve 86. This provides a "parking brake" function, but would become ineffective over a long period of time if leakage in the various components of the system were to deplete the pressure in the main reservoir 61. To protect against this possibility, two of the brake actuators (element 22 in FIG. 3) on the bogie are equipped with spring operated air released "springbrake" cylinders 92 which are typically physically piggy-backed atop the regular brake cylinders 88. The springbrake cylinders 92 are connected to main reservoir 61 via line 100, and are thus held released as long as sufficient pressure is present in the main reservoir. Should main reservoir 61 leak down, however, the springs within the springbrake cylinders 92 serve to provide a mechanical backup brake application. Thus, under normal circumstances, the spring brakes 92 are inactive during all phases of operation, and serve only to provide "insurance" on periods of inactivity.

Nevertheless, a failure may occur during train operation which would deplete the pressure in main reservoir 61. In such a case, spring brake cylinders 92 would produce an undesirable brake application while the train is operating. If undetected, this could eventually cause wheel failure due to overheating and cause an accident. To eliminate this unfortunate possibility, a spring-brake protection valve 93 is provided. As can be seen, the control port 94 of this valve is connected to main reservoir 61 by line 100, whereas the supply port 95 of the valve is connected to the brake pipe by line 71. Finally, the delivery port 96 of the valve is open to exhaust. This valve is held closed by pressure at its control port 94 and opens its supply port 95 to delivery, in this case to atmosphere, as its control port pressure decreases. The operating point of this valve is chosen so that the valve will open at a control pressure slightly higher than the pressure necessary to keep the spring-brake cylinders 92 released. Should main reservoir 61 pressure deplete for any reason, springbrake protection valve 93 will open the brake pipe to exhaust. This will cause a rapid, uncontrolled drop in brake pipe pressure, initiating an emergency brake application that will propagate through the train. This ensures that the train will stop before wheel overheating due to a springbrake application. This also provides protection against other component or piping failures which could deplete the main reservoir during operation.

The action of the springbrake protection valve 93 described above enables an automatic "hot box" detector feature to be included in the air system. More particularly, axle bearing failures occasionally occur in all types of rail cars. These failures result in bearing overheating and are referred to as "hot boxes". If undetected, such failures can result in the axle bearing literally melting off the end of an axle. Conventional practice uses infrared sensing devices adjacent the track which "look" at the bearings as each train passes the detector location, sounding an alarm if an overtemperature condition is detected. Unfortunately, detector locations are often miles apart and failures can and do occur between them resulting in accidents. The air system provided in accordance with the present invention includes a full-time on board hot box detection system. Fusible plugs 97 are mounted to each bearing adapter 14 on the rail bogie. The fusible plugs 97 are piped to the main reservoir 61 by line 100. Should any bearing overheat, its fusible plug will melt and blow out, opening the main reservoir 61 to exhaust. As the main reservoir pressure decreases, the spring brake protection valve 93 will "sense" a failure and initiate an emergency brake application, automatically stopping the train. The restrictor choke 59 insures that the flow of air from the train's supply line to the main reservoir is less than the flow out of the reservoir due to the hot box detector. Thus, main reservoir 61's pressure will drop even though it is constantly being supplied from the train's supply line. Finally, the actual melting temperature of the hot box detector fusible plug 97 is considerably lower than the temperature at which total failure or melting of the bearing occurs. This will insure that the train will stop well before a major accident occurs.

While the invention has been described in connection with what is presently considered to be the most practical and preferred embodiment, it is to be understood that the invention is not to be limited to the disclosed embodiment, but on the contrary, it is intended to cover various modifications and equivalent arrangements included within the spirit and scope of the appended claims.

What is claimed is:

1. A rail bogie for coupling to a convertible rail-highway vehicle for operating the vehicle in rail mode, comprising:
    first and second wheelset assemblies, each said assembly including an axle having rail wheels mounted to each end thereof;
    first and second sideframe members coupled to and extending between said wheelset assemblies on each side of the rail bogie;
    a bolster assembly operatively coupled to and extending between said sideframe members;
    a coupling assembly mounted to said bolster assembly for coupling the rail bogie to an associated convertible rail-highway vehicle;
    a spring assembly mounted to each said sideframe member so as to be disposed intermediate each said sideframe member and said bolster assembly respectively;
    said spring assembly comprising at least first and second airspring assemblies each mounted to a respective side frame member of the rail bogie; and
    said bolster assembly including reservoir means for storing air operatively coupled to said airspring assemblies.

2. A rail bogie as in claim 1, further comprising maintaining means for automatically maintaining said airspring assemblies at a predetermined height.

3. A rail bogie as in claim 1, further comprising pressure control means for varying pressure in said airspring assemblies to alter the height of said bolster assembly relative to said sideframe members so as to alter the overall height of the bogie.

4. A rail bogie for coupling to a convertible rail-highway vehicle for operating the vehicle in rail mode, comprising:
    first and second wheelset assemblies, each said assembly including an axle having rail wheels mounted to each end thereof;
    fist and second sideframe members coupled to and extending between said wheelset assemblies on each side of the rail bogie;
    a bolster assembly operatively coupled to and extending between said sideframe members;
    a coupling assembly mounted to said bolster assembly for coupling the rail bogie to an associated convertible rail-highway vehicle;
    a tubular pivot assembly mounted to and extending between said sideframe members for permitting relative pivotal movement thereof about an axis substantially parallel to said axles while substantially preventing relative longitudinal movement thereof;
    a spring assembly mounted to each said sideframe member so as to be disposed intermediate each said sideframe member and said bolster assembly respectively;
    a pneumatic brake assembly mounted to said sideframe members adjacent said wheels for braking said wheels; and
    said tubular pivot assembly including a reservoir for storing air for said pneumatic brake assembly.

5. A rail bogie as in claim 4, wherein said tubular pivot assembly includes a main gimbal tube element mounted at one end thereof to said first sideframe member and a tubular member mounted at one end thereof to said second sideframe member, said gimbal tube being rotatably received in said tubular member.

6. A rail bogie as in claim 4, wherein the overall height of the rail bogie is less than or equal to about thirty inches.

7. A rail bogie as in claim 4, further comprising side bearing means upon which an associated vehicle rests for providing a direct load path from the vehicle to said wheelsets through said sideframes.

8. A rail bogie as in claim 4, further comprising lateral link elements pivotally coupled to and between said bolster assembly and said sideframe members, said lateral link elements having resilient bushings on the ends thereof so as to increase lateral freedom of said bolster assembly relative to said sideframe.

9. A rail bogie as in claim 4, wherein said coupling assembly comprises a pin element having an enlarged top portion mounted to and extending upwardly from a central portion of said bolster assembly means.

10. A rail bogie as in claim 9, wherein the rail bogie can be lifted off associated railroad tracks by said pin element.

11. A rail bogie as in claim 4, wherein said rail bogie further comprises connector means for coupling said pneumatic brake assembly to air supply means provided on said convertible rail-highway vehicle.

12. A rail bogie as in claim 11, wherein said means for coupling to air supply means are provided on both sides of the rail bogie whereby the rail bogie is fully bi-directional.

13. A rail bogie for carrying a vehicle body comprising:
    first and second wheelset assemblies, each said assembly including an axle having rail wheels mounted to each end thereof;
    first and second sideframe members coupled to and extending between said wheelset assemblies on each side of the rail bogie;
    a bolster assembly operatively coupled to and extending between said sideframe members;
    a coupling assembly mounted to said bolster assembly for coupling the rail bogie to an associated vehicle body;
    a pivot assembly mounted to an extending. between said sideframe members for permitting relative pivotal movement thereof about an axis substantially parallel to said axles while substantially preventing relative longitudinal movement thereof;
    said pivot assembly means includes a main gimbal tube element mounted at one end thereof to said first sideframe member and a tubular member mounted at one end thereof to said second sideframe member, said gimbal tube being rotatably received in said tubular member;
    a spring assembly mounted to each said sideframe member so as to be disposed intermediate each said sideframe member and said bolster assembly, respectively;

a pneumatic brake assembly mounted to said sideframe members adjacent to said wheels for braking said wheels; and said main gimbal tube includes a reservoir for storing air for said pneumatic brake system.

14. A rail bogie as in claim 13, wherein said brake assembly includes connector means for coupling said pneumatic brake to air supply means provided on said vehicle body.

15. A rail bogie as in claim 13, wherein the overall height of the rail bogie is less than or equal to about thirty inches.

16. A rail bogie as in claim 13, further comprising side bearing means upon which an associated vehicle rests for providing a direct load path from the vehicle to said wheelsets through said sideframes.

17. A rail bogie as in claim 13, wherein said coupling assembly comprises a pin element having an enlarged top portion mounted to and extending upwardly from a central portion of said bolster assembly means.

18. A rail bogie s in claim 17, wherein the rail bogie can be lifted off associated railroad tracks by said pin element.

19. A rail bogie as in claim 13, wherein said brake assembly includes connector means for coupling said pneumatic brake means to air supply means provided on said convertible rail-highway vehicle.

20. A rail bogie as in claim 19, wherein said means for coupling to air supply means are provided on both sides of the rail bogie whereby the rail bogie is fully bi-directional.

21. A rail bogie as in claim 13, wherein said spring assembly comprise at least first and second airspring assemblies each mounted to a respective sideframe member of the rail bogie.

22. A rail bogie as in claim 21, wherein said bolster assembly includes a reservoir for storing air operatively coupled to said airspring assemblies.

23. A rail bogie as in claim 21, further comprising maintaining means for automatically maintaining said airspring assemblies at a predetermined height.

24. A rail bogie as in claim 21, further comprising pressure control means for varying pressure in said airspring assemblies to alter the height of said bolster assembly relative to said sideframe members so as to alter the overall height of the bogie.

25. A rail bogie as in claim 21, further comprising lateral link elements pivotally coupled to and between said bolster assembly and said sideframe members, said lateral link elements having resilient bushings on the ends thereof so as to increase lateral freedom of said bolster assembly relative to said sideframes.

* * * * *